(No Model.)
A. FRYER.
CAR FENDER.
No. 552,283. Patented Dec. 31, 1895.
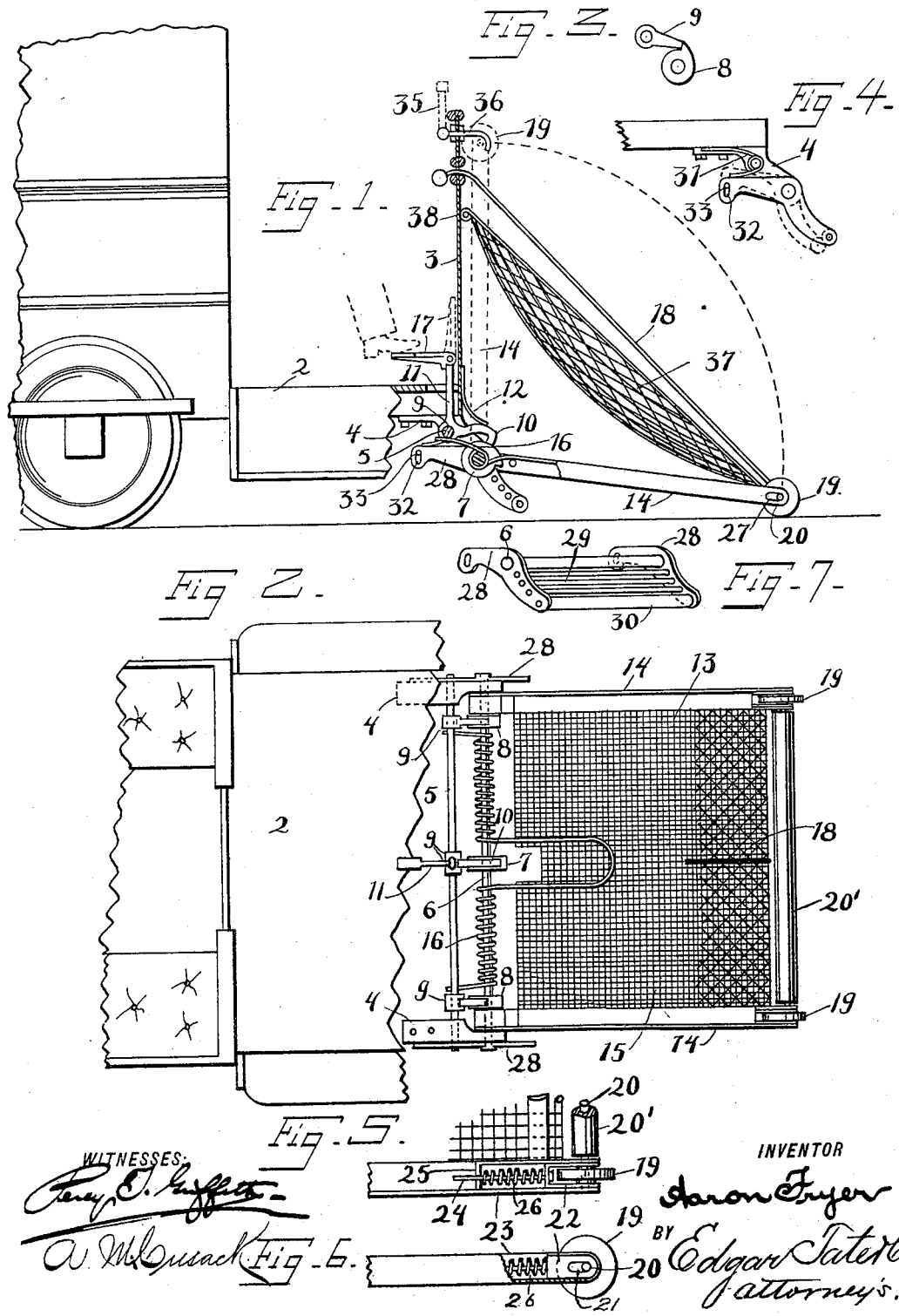
WITNESSES:
INVENTOR
Aaron Fryer
BY Edgar Tate & Co
attorneys.

UNITED STATES PATENT OFFICE.

AARON FRYER, OF BATH-ON-HUDSON, NEW YORK.

CAR-FENDER.

SPECIFICATION forming part of Letters Patent No. 552,283, dated December 31, 1895.

Application filed March 19, 1895. Serial No. 542,325. (No model.)

*To all whom it may concern:*

Be it known that I, AARON FRYER, a citizen of the United States, and a resident of Bath-on-Hudson, county of Rensselaer, and State of New York, have invented certain new and useful Improvements in Car-Fenders, of which the following is a specification, reference being had to the accompanying drawings, forming a part thereof, in which similar figures of reference indicate corresponding parts in all the views.

This invention relates to safety-fenders for tramway-cars, and the object thereof is to provide a simple and effective device of this class, which, when attached to a car, will prevent to a large extent the numerous and sometimes fatal accidents which frequently occur, or at least prevent the taking of the life or the serious maiming of the individuals in such accidents.

The invention is fully disclosed in the following specification, of which the accompanying drawings form a part, in which—

Figure 1 represents a section of the end of a car provided with my improvement, the dashboard connected therewith being in central vertical section the better to show the arrangement of the various parts; Fig. 2, a plan view of the fender attached to the car, the dashboard and part of the platform being removed; Figs. 3, 4, 5, and 6, details of the construction employed, and Fig. 7 an auxiliary fender which I employ.

The application of my invention does not change or in any way interfere with the form or construction of the car, as will be seen from the following description.

Referring to Fig. 1 of the drawings, the numeral 2 designates the platform of a car to which my improvement is attached, and 3 the usual dashboard. Secured at each side of the platform and at the front end thereof is a bracket or hanger 4, and journaled in these hangers, just below the platform, is a revoluble auxiliary shaft 5, (better shown in Fig. 2,) and below the shaft 5 and preferably forward thereof is also journaled a main shaft 6, to which, at the middle thereof and a short distance from each end, are rigidly secured sprocket or ratchet wheels 7 and 8, respectively. On the shaft 5, at each side thereof, are rigidly secured pawls 9, designed to operate in connection with the wheels 8 on shaft 6, and at the middle of the shaft is rigidly secured a crank-lever 9, the outer end of which is formed into a pawl 10 adapted to operate in connection with the sprocket or ratchet wheel 7 on the shaft 6, and the inner upper end or arm 11 of which extends up through the platform of the car adjacent to the dashboard 3, where it can be reached and operated by the foot or hand, and secured to the dashboard 3 is a spring 12, which operates to hold the pawl 10 depressed and in contact with the wheel 7. A frame or fender 13, provided with side bars 14, is rigidly secured to the shaft 6 by means of said side bars, and the body of this frame preferably consists of a wire netting 15, secured thereto in any desired manner. Mounted upon the shaft 6 on each side of the ratchet 7 is a wire spring 16, one end of which is secured to the shaft 5 and the other to the frame 13, or said springs may consist of single wires folded in the middle upon said frame, as shown, and the ends may be secured to the shaft 6, instead of to the shaft 5, if desired, the object of said spring or springs being to hold the fender depressed, as in Figs. 1 and 2, or to permit of its being folded or raised to the position shown in dotted lines in Fig. 1 when desired. The upper end 11 of the lever 9 is preferably provided with a hinged arm 17, so hinged as to permit of its being dropped backward to a right angle with the arm 11, as shown in Fig. 1, or elevated to a vertical position, as shown in dotted lines.

Secured to the front end of the frame 13 is a cord or rod 18. preferably the former, which is carried upwardly and backwardly and passed through the top of the dashboard, the object of which is to fold or lift the fender to the position shown in dotted lines.

In each of the side bars 14 at the forward ends thereof is mounted a wheel or roller 19, adapted to travel along the rails of the track. I prefer to mount these rollers on a shaft 20, which extends across the frame in front and is mounted at each end by means of longitudinal slots 21, Fig. 6, in sliding yoke-like boxes or housings 22, located in said side bars, which are provided at the ends with openings or cavities 23, practically square in cross-section to admit of this arrangement. The housings 22 are open in front and closed at the rear ends, and a bolt or rod 24 is secured to this end and passed backwardly through a cross brace or bar 25, and between said brace and the end of the housing is a spring 26, which normally operates to keep the shaft 20 and the rollers 19 thereon pressed forward as far as the slots in the housings and corresponding slots 27 in the side bars will admit, and the shaft 20 is in practice preferably provided with a thick covering of soft rubber or similar material 20', as shown in Fig. 5.

Connected with or mounted on the shaft 6 by means of curved side arms 28 is an auxiliary fender or guard, (shown in Fig. 7,) consisting of said side arms 28 and cross-bars 29 and a revoluble bar 30, which is also, as in the case of shaft 20, covered preferably with soft rubber or similar material.

As shown in Fig. 2, the curved arms 28 are preferably secured outside of the brackets 4 and are revoluble on the shaft 6, but are normally held in the position shown in Figs. 1 and 4 by a spring 31, mounted, preferably at each side, on the shaft 5, one end of which has a bearing on the side of the platform and the other on the inner or backward end of the arm 28, which is provided with a slot 32, through which passes a hook or loop 33, secured to the bracket 4 or to the bottom of the platform. As thus constructed and attached, the auxiliary fender will be carried in the position shown by the arms 28 in Fig. 1, the forward part thereof extending outward and downwardly almost to the rails, but preferably not so as to come in contact therewith. I also employ in connection with the main fender or guard a flexible net 37, being in form substantially the same as the fender or guard. This flexible net is secured at one end to the forward end of the guard or fender in any desired manner, and at the other end is secured by means of a rod 38 or equivalent device to the upper portion of the dash-board.

The operation of my improved fender will be readily understood from the foregoing description, in connection with the accompanying drawings. When not in use, it is folded in the position shown in dotted lines in Fig. 1, and this also will preferably be the position of the fender when the car is in motion, unless an accident is imminent, the fender being held in the upright position by means of the pawl 10, connected with the lever 9, operating on the sprocket or ratchet 7, mounted on the shaft 6, and, when desired, a weighted lever 35, having an arm 36 connected therewith at right angles thereto, extending through the top of the dashboard and provided with a hook adapted to grasp the shaft 19, may also be employed to secure the fender in this upright position. If, however, it is desired to lower the fender into the operative position shown in Figs. 1 and 2, it is only necessary to press downwardly on the arm 17 of the lever with the foot and slightly pulling backward at the same time, when the pawl 10 will be released from its connection with the sprocket-wheel 7 and the fender 13 will be thrown forward into the position shown in Fig. 1 by means of the wire springs 16, where it will remain until again elevated to the position shown in dotted lines. If while in this position an accident should occur or a person be struck by the fender, he will be thrown backward and caught by the netting 37. By means of this arrangement no serious accident can happen to the person or individual whom the fender may happen to strike, the shaft 20 being, as described, provided with a thick or heavy coating of soft rubber or similar material, constituting a buffer and also tending to decrease the injurious effect of the blow and the possibility of injury.

It will be observed, of course, that the netting 37 is not an essential element of my invention and may be omitted, if desired, in which event the person struck would fall upon the wire-netting 15, which constitutes the body of the fender proper. It will also be observed that the auxiliary fender is of no practical importance when the main fender is in operation, unless by some accident the forward end of the fender should be elevated over the object or person struck, in which case the auxiliary fender would then serve to prevent the person or object from passing beneath the car; and in case an accident should occur when the main fender is in elevated position it will readily be seen that the auxiliary fender as constructed and applied will prevent the passage of a person or object beneath the front platform of the car, and consequently beneath the wheels thereof.

When the fender is in the position shown in Fig. 1, the pawls 9 operate in connection with the sprockets or ratchets 8 to hold the same in said position, in which operation they are assisted by the springs 16, and it cannot be elevated except intentionally and by the operation of the foot or hand on the crank-lever 11, which is mounted on the shaft 5, to which the pawls 9 are also rigidly secured, and it will readily be seen that when the lever 11 is operated to release these pawls the fender may be raised to the elevated position, or that shown in dotted lines, by means of the cord or rod 18.

I do not regard my invention as confined to the exact form and construction of devices shown and described, as it is evident that many changes therein and modifications thereof may be made without departing from the scope of my invention.

Having fully described said invention, its construction and operation, what I claim, and desire to secure by Letters Patent, is—

1. The combination, with a car, of a shaft pivotally connected with the platform thereof by means of hangers secured thereto, a fender or guard consisting of a frame rigidly secured to said shaft a spring or springs secured to said shaft, and in contact with said frame adapted to hold the guard or fender in an extended and operative position, and means for elevating the same to a vertical position and securing it therein, substantially as shown and described.

2. The combination, with a car, of a fender or guard consisting of a frame, one end of which consists of a shaft pivotally connected with hangers secured to the platform of the car, and the other end of which is adapted to be extended in front thereof adjacent to or in contact with the rails of the track, a spring mounted on said shaft one part of which is adapted to bear on the fender or guard-frame, to keep it extended, and said fender or guard being adapted to be folded to a vertical position and secured therein or to be projected in front of the car, and the body thereof being composed of a net work of wire or similar material, substantially as shown and described.

3. The combination, with a car, of a fender or guard consisting of a frame, the sides of which are rigidly secured to a main shaft pivotally connected with the platform of the car, a second shaft pivotally connected with the platform of the car, a spring or springs on the main shaft to which the fender is secured, one end of which is rigidly supported and the other connected with the frame of the fender or guard, sprocket-wheels or ratchets also connected with said main shaft and pawls connected with the second or auxiliary shaft adapted to operate in connection therewith, to hold the guard or fender in an operative position, and means for releasing said pawls and elevating the fender to a vertical position, and means for holding the same in said position, substantially as shown and described.

4. The combination, with a car, of a fender, consisting of a frame rigidly secured to a main shaft pivotally connected with said car, an auxiliary shaft also pivotally connected with said car, said main shaft being provided with sprocket- or ratchet-wheels rigidly secured thereto and said auxiliary shaft being provided with pawls rigidly secured thereto, said pawls and ratchets being adapted to hold the fender in a depressed and operative position, and means for operating the auxiliary shaft to release the pawls and for elevating the fender and securing it in an elevated position, substantially as shown and described.

5. The combination, with a car, of a fender or guard consisting of a frame rigidly secured to a main shaft pivotally connected with the platform of the car, an auxiliary shaft also pivotally connected with the platform of the car, said main shaft being provided with springs, one end of which is secured to said auxiliary shaft and the other to the frame of the fender or guard, said main shaft being also provided near each end thereof with a sprocket- or ratchet-wheel rigidly secured thereto, and said auxiliary shaft being also provided near each end thereof with a pawl rigidly secured thereto, adapted to act in connection with said ratchets, a central sprocket-wheel rigidly secured to the main shaft, and a crank lever rigidly secured centrally of the auxiliary shaft, said crank lever being provided with an arm adapted to act as a pawl in connection with the central sprocket on the main shaft, and the other end thereof extending upwardly and adapted to be operated from the platform of the car, substantially as shown and described.

6. The combination, with a car, of a fender or guard consisting of a frame rigidly secured to the main shaft pivotally connected with the platform of the car, an auxiliary shaft also pivotally connected with the platform of the car, said main shaft being provided with springs, one end of which is secured to said auxiliary shaft and the other to the frame of the fender or guard, said main shaft being also provided near each end thereof with a sprocket- or ratchet-wheel rigidly secured thereto, and said auxiliary shaft being also provided near each end thereof with a pawl rigidly secured thereto, adapted to act in connection with said ratchets, a central sprocket-wheel rigidly secured to the main shaft, and a crank lever rigidly secured centrally of the auxiliary shaft, said crank lever being provided with an arm adapted to act as a pawl in connection with a central sprocket on the main shaft, and the other end thereof extending upwardly and adapted to be operated from the platform of the car, and means for elevating the fender or guard to a vertical position and securing it therein, substantially as shown and described.

7. The combination, with a car, of brackets or hangers secured to the front platform at each side thereof, a fender or guard rigidly connected with a main shaft pivotally supported in said brackets or hangers, an auxiliary shaft also pivotally supported by said brackets or hangers above the main shaft, a spring mounted on said main shaft, one end of which is secured to the frame thereof and the other rigidly secured to the auxiliary shaft, sprocket-wheels rigidly connected with said main shaft and corresponding pawls rigidly connected with the auxiliary shaft, said springs and ratchets and pawls being adapted to hold the guard or fender in a depressed and operative position, and means for operating the pawls and sprockets to admit of folding or elevating the fender or guard to a vertical position, substantially as shown and described.

8. The combination, with a car, of brackets or hangers secured to the platform thereof and extending forward of the same, a fender or guard rigidly secured to a main shaft mounted in said hangers, an auxiliary shaft also mounted in said hangers above the main shaft, a spring or springs mounted on said main shaft, one end of which is rigidly secured to the frame of the fender or guard and the other to the main shaft or other support, a sprocket-wheel mounted centrally of the main shaft, and a pawl mounted centrally of the auxiliary shaft and adapted to act in connection therewith to hold the fender or guard in an elevated position, and means for elevating or folding said fender or guard against the operation of said spring or springs, substantially as shown and described.

9. The combination, with a car, of brackets or hangers secured to the front end of the platform and at each side thereof, a fender or guard consisting of a frame rigidly secured to a main shaft journaled in said hangers, an auxiliary shaft also journaled in said hangers above the main shaft, a spring or springs mounted on said main shaft, one end of which is rigidly secured to the frame of the fender or guard and the other to the auxiliary shaft, a sprocket-wheel rigidly secured to said main shaft near each end thereof, and a corresponding pawl rigidly secured to the auxiliary shaft near each end thereof, the operation of said sprockets and pawls and the spring or springs being to hold the fender in a depressed and operative position, a central sprocket-wheel or ratchet rigidly secured to the main shaft, and a crank lever rigidly secured to the auxiliary shaft near the center thereof, one end of which is adapted to serve as a pawl and operate in connection with the central sprocket on the main shaft to hold the fender or guard in an elevated position, and the other end of which extends upwardly through the front platform and is adapted to be operated therefrom, substantially as shown and described.

10. The combination, with a car, of brackets or hangers secured to the front end of the platform and at each side thereof, a fender or guard consisting of a frame rigidly secured to a main shaft journaled in said hangers, an auxiliary shaft also journaled in said hangers above the main shaft, a spring or springs mounted on said main shaft, one end of which is rigidly secured to the frame of the fender or guard and the other to the auxiliary shaft, a sprocket-wheel rigidly secured to said main shaft near each end thereof, and a corresponding pawl rigidly secured to the auxiliary shaft near each end thereof, the operation of said sprockets and pawls and the spring or springs being to hold the fender in a depressed and operative position, a central sprocket-wheel or ratchet rigidly secured to the main shaft, and a crank lever rigidly secured to the auxiliary shaft near the center thereof, one end of which is adapted to serve as a pawl and operate in connection with the central sprocket on the main shaft, to hold the fender or guard in an elevated position, and the other end of which extends upwardly through the front platform and is adapted to be operated therefrom, and means for securing the fender or guard in an elevated position when desired, substantially as shown and described.

11. The combination, with a car, of a fender or guard consisting of a frame the inner end of which consists of a shaft pivotally mounted, in hangers connected with the platform of the car, the body of said fender or guard consisting of a net work of wire or similar material, a flexible net extending from the front edge of the frame of the fender or guard and upward and secured to the dash-board of the car, and a spring or springs mounted on the shaft and operating to keep the fender or guard extended in front of the car, substantially as shown and described.

12. The combination, with a car, of a fender or guard consisting of a frame the inner end of which consists of a shaft pivotally mounted, in hangers connected with the platform of the car, the body of said fender or guard consisting of a net work of wire or similar material, a flexible net extending from the front edge of the frame of the fender or guard and upward and secured to the dash-board of the car, the body of the fender or guard being composed of a net work of wire or similar material and a supplemental fender or guard pivotally mounted on the said shaft, consisting of a frame one portion of which is adapted to extend forward adjacent to the track and means for supporting the same in said position, substantially as shown and described.

13. The combination with a car, of a fender or guard, consisting of a frame one end of which consists of a shaft pivotally supported at the front end of the car and the other end of which is adapted to be extended forward of the car adjacent to or in contact with the rails, said fender or guard being adapted to be folded to a vertical position and held therein, and an auxiliary fender consisting of a frame the sides of which are also pivotally connected with the shaft of the fender or guard and supported thereon in such manner as to extend forward of the car platform and adjacent to the rails of the track, substantially as shown and described.

14. The combination, with a car, of a fender or guard consisting of a frame one end of which consists of a shaft pivotally supported below the platform of the car, and the other end of which is adapted to extend forward of the car and adjacent to or in contact with the rails of the track, said fender or guard being adapted to be folded to a vertical position and held therein, and an auxiliary fender consisting of side arms pivotally connected with said shaft, and cross bars connected with said side arms, one part of said arms being extended forward and downward adjacent to the rails and the other part thereof backward, and provided with a slot adapted to receive a pin or projection secured to a hanger connected with the platform of the car, and a spring or springs operating to hold the forward end of the auxiliary fender or guard frame at a short distance from the track, substantially as shown and described.

In testimony that I claim the foregoing as my invention I have signed my name, in presence of two witnesses, this 15th day of March, 1895.

AARON FRYER.

Witnesses:
PERCY T. GRIFFITH,
A. M. CUSACK.